United States Patent
Walker (10) Patent No.: US 7,373,657 B2
(45) Date of Patent: May 13, 2008

(54) METHOD AND APPARATUS FOR CONTROLLING DATA AND SOFTWARE ACCESS

(75) Inventor: William T. Walker, Evergreen, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 819 days.

(21) Appl. No.: 10/385,817

(22) Filed: Mar. 10, 2003

(65) Prior Publication Data

US 2004/0181695 A1 Sep. 16, 2004

(51) Int. Cl.
- G06F 7/04 (2006.01)
- G06F 11/30 (2006.01)
- H04L 9/32 (2006.01)
- G06K 9/00 (2006.01)
- G04L 9/00 (2006.01)

(52) U.S. Cl. .................. 726/4; 726/27; 726/28; 726/29; 726/30; 713/168; 713/169; 713/170; 713/171; 709/201; 709/202; 709/203; 380/270; 380/30

(58) Field of Classification Search ............... 726/4
See application file for complete search history.

(56) References Cited

U.S. PATENT DOCUMENTS

| | | | |
|---|---|---|---|
| 4,288,659 A | 9/1981 | Atalla | 178/22.08 |
| 4,780,821 A | 10/1988 | Crossley | |
| 4,811,393 A | 3/1989 | Hazard | 380/21 |
| 4,888,800 A | 12/1989 | Marshall et al. | 380/21 |
| 4,937,863 A | 6/1990 | Robert et al. | 710/200 |
| 5,157,663 A | 10/1992 | Major et al. | 714/10 |
| 5,179,591 A | 1/1993 | Hardy et al. | 380/21 |
| 5,204,897 A | 4/1993 | Wyman | 380/4 |
| 5,206,903 A | 4/1993 | Kohler et al. | |
| 5,230,020 A | 7/1993 | Hardy et al. | 380/21 |
| 5,260,999 A | 11/1993 | Wyman | |
| 5,307,481 A | 4/1994 | Shimazaki et al. | 714/11 |
| 5,329,570 A | 7/1994 | Glassmacher et al. | 379/189 |
| 5,341,427 A | 8/1994 | Hardy et al. | 380/21 |
| 5,347,580 A | 9/1994 | Molva et al. | |
| 5,386,369 A | 1/1995 | Christiano | |
| 5,390,297 A | 2/1995 | Barber et al. | |

(Continued)

FOREIGN PATENT DOCUMENTS

EP 1 071 253 A1 1/2001

OTHER PUBLICATIONS

U.S. Appl. No. 10/811,412, Walker, filed Mar. 25, 2004.

(Continued)

*Primary Examiner*—Ayaz Sheikh
*Assistant Examiner*—Longbit Chai
(74) *Attorney, Agent, or Firm*—Sheridan Ross P.C.

(57) ABSTRACT

A proximity based computer access system is provided. According to the invention, a local key associated with a workstation wirelessly communicates with a local key which is associated with a user. If the user, and remote key, are outside of a preset radius of the workstation, access to the workstation is disabled. Accordingly, a workstation is secured from unauthorized access when an authorized user is not nearby. The present invention allows organizations to efficiently secure sensitive data from unauthorized access while reducing the requirements of users to manually enable and disable access to the sensitive data through the workstation.

23 Claims, 5 Drawing Sheets

U.S. PATENT DOCUMENTS

| | | | |
|---|---|---|---|
| 5,408,649 A | 4/1995 | Beshears et al. | 714/10 |
| 5,448,639 A | 9/1995 | Arazi | |
| 5,553,143 A | 9/1996 | Ross et al. | |
| 5,563,946 A | 10/1996 | Cooper et al. | |
| 5,671,412 A | 9/1997 | Christiano | 707/104.1 |
| 5,699,431 A | 12/1997 | Van Oorschot et al. | 380/30 |
| 5,708,709 A | 1/1998 | Rose | 705/59 |
| 5,717,604 A | 2/1998 | Wiggins | 709/229 |
| 5,742,757 A | 4/1998 | Hamadani et al. | |
| 5,745,576 A | 4/1998 | Abraham et al. | 380/25 |
| 5,745,879 A | 4/1998 | Wyman | 705/1 |
| 5,758,068 A | 5/1998 | Brandt et al. | 726/27 |
| 5,758,069 A | 5/1998 | Olsen | |
| 5,790,074 A | 8/1998 | Rangedahl et al. | 342/357.13 |
| 5,790,664 A | 8/1998 | Coley et al. | 380/4 |
| 5,828,747 A | 10/1998 | Fisher et al. | |
| 5,905,793 A | 5/1999 | Flockhart et al. | |
| 5,905,860 A | 5/1999 | Olsen et al. | 395/187.01 |
| 5,940,504 A | 8/1999 | Griswold | 705/59 |
| 5,960,085 A * | 9/1999 | de la Huerga | 340/5.61 |
| 5,978,565 A | 11/1999 | Ohran et al. | 714/13 |
| 5,982,873 A | 11/1999 | Flockhart et al. | |
| 6,011,973 A | 1/2000 | Valentine et al. | 455/456.6 |
| 6,023,766 A | 2/2000 | Yamamura | |
| 6,067,621 A | 5/2000 | Yu et al. | |
| 6,108,703 A | 8/2000 | Leighton et al. | 709/226 |
| 6,128,389 A | 10/2000 | Chan et al. | |
| 6,134,660 A | 10/2000 | Boneh et al. | |
| 6,148,415 A | 11/2000 | Kobayashi et al. | 714/15 |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,314,565 B1 | 11/2001 | Kenner et al. | |
| 6,502,079 B1 | 12/2002 | Ball et al. | 705/59 |
| 6,513,121 B1 | 1/2003 | Serkowski | 713/201 |
| 6,574,612 B1 | 6/2003 | Baratti et al. | 705/59 |
| 6,584,454 B1 | 6/2003 | Hummel et al. | 705/59 |
| 6,640,305 B2 | 10/2003 | Kocher et al. | |
| 6,675,208 B1 | 1/2004 | Rai et al. | |
| 6,765,492 B2 | 7/2004 | Harris | 340/686.6 |
| 6,775,782 B1 | 8/2004 | Buros et al. | |
| 6,778,820 B2 | 8/2004 | Tendler | 455/414.2 |
| 6,826,606 B2 | 11/2004 | Freeman et al. | 709/223 |
| 6,850,958 B2 | 2/2005 | Wakabayashi | 707/204 |
| 6,854,010 B1 | 2/2005 | Christian et al. | 709/223 |
| 6,883,095 B2 | 4/2005 | Sandu et al. | |
| 6,920,567 B1 | 7/2005 | Doherty et al. | 726/22 |
| 6,928,166 B2 | 8/2005 | Yoshizawa | |
| 6,928,558 B1 | 8/2005 | Allahwerdi et al. | |
| 6,934,848 B1 | 8/2005 | King et al. | |
| 6,976,164 B1 | 12/2005 | King et al. | |
| 7,032,113 B2 | 4/2006 | Pendlebury | |
| 7,085,382 B2 * | 8/2006 | Terao et al. | 380/247 |
| 2001/0001268 A1 | 5/2001 | Menon et al. | |
| 2001/0013024 A1 | 8/2001 | Takahashi | |
| 2002/0001302 A1 | 1/2002 | Pickett | 370/352 |
| 2002/0017977 A1 | 2/2002 | Wall | 340/5.28 |
| 2002/0038422 A1 | 3/2002 | Suwamoto et al. | |
| 2002/0052939 A1 | 5/2002 | Lee | |
| 2002/0083003 A1 | 6/2002 | Halliday | 705/52 |
| 2002/0087892 A1 | 7/2002 | Hideyo | |
| 2002/0104006 A1 | 8/2002 | Boate et al. | |
| 2002/0107809 A1 | 8/2002 | Biddle et al. | |
| 2002/0112186 A1 | 8/2002 | Ford et al. | |
| 2002/0125886 A1 | 9/2002 | Bates et al. | 324/307 |
| 2002/0154777 A1 | 10/2002 | Candelore | 380/258 |
| 2002/0164025 A1 | 11/2002 | Raiz et al. | 380/231 |
| 2002/0174356 A1 | 11/2002 | Padole et al. | 713/200 |
| 2002/0176404 A1 | 11/2002 | Girard | 370/352 |
| 2002/0188656 A1 * | 12/2002 | Patton et al. | 709/201 |
| 2002/0188704 A1 | 12/2002 | Gold | |
| 2002/0194473 A1 | 12/2002 | Pope et al. | |
| 2003/0005427 A1 | 1/2003 | Herrero | 717/178 |
| 2003/0013411 A1 * | 1/2003 | Uchiyama | 455/40 |
| 2003/0055749 A1 | 3/2003 | Carmody et al. | |
| 2003/0144959 A1 | 7/2003 | Makita | |
| 2003/0149874 A1 | 8/2003 | Balfanz et al. | |
| 2003/0208449 A1 | 11/2003 | Diao | |
| 2004/0044629 A1 | 3/2004 | Rhodes et al. | 705/59 |
| 2004/0044630 A1 | 3/2004 | Walker et al. | 705/59 |
| 2004/0044631 A1 | 3/2004 | Walker et al. | 713/200 |
| 2004/0044901 A1 | 3/2004 | Serkowski et al. | 713/200 |
| 2004/0054909 A1 | 3/2004 | Serkowski et al. | 713/200 |
| 2004/0054930 A1 | 3/2004 | Walker et al. | 705/59 |
| 2004/0073517 A1 | 4/2004 | Zunke et al. | 705/59 |
| 2004/0078339 A1 | 4/2004 | Goringe et al. | 705/59 |
| 2004/0103324 A1 | 5/2004 | Band | |
| 2004/0128551 A1 | 7/2004 | Walker et al. | 713/201 |
| 2004/0162998 A1 | 8/2004 | Tuomi et al. | |
| 2004/0166878 A1 | 8/2004 | Erskine et al. | 455/456.1 |
| 2004/0172367 A1 | 9/2004 | Chavez | 705/59 |
| 2004/0181695 A1 | 9/2004 | Walker | 713/202 |
| 2004/0181696 A1 | 9/2004 | Walker | 713/202 |
| 2004/0199760 A1 | 10/2004 | Mazza | 713/150 |
| 2004/0260589 A1 | 12/2004 | Varadarajan et al. | |
| 2005/0086174 A1 | 4/2005 | Eng | |
| 2005/0202830 A1 | 9/2005 | Sudit | 455/456.1 |
| 2005/0246098 A1 | 11/2005 | Bergstrom et al. | 701/213 |
| 2006/0036894 A1 | 2/2006 | Bauer et al. | |
| 2006/0178953 A1 | 8/2006 | Aggarwal et al. | |
| 2006/0242083 A1 | 10/2006 | Chavez | |

OTHER PUBLICATIONS

U.S. Appl. No. 10/947,418, Gilman et al., filed Sep. 21, 2004.

U.S. Appl. No. 10/775,498, Gilman et al., filed Feb. 9, 2004.

Articsoft Limited, "Public Key Infrastructure (PKI) FAQs" (Feb. 2, 2003), available at http://www.articsoft.com/wp_pki_fag.htm, 5 pages.

Arsys, "Public Key Infrastructure," (Feb. 4, 2001), available at http://www.transactiontrust.com/technicaindex.html, 4 pages.

"Digital Cinema Key Management Messages," Draft 1 (Aug. 8, 2002), pp. 1-9.

Discerning the Times Digest and Newsbytes, "Global Control of All Buying and Selling Now Possible," vol. 1, Iss. 1 (Jan. 2000), available at http://www.discerningtoday.org/members/Digest/2000Digest/January/Global%20Control.htm, 2 pages.

Info Merchant Store, "VeriFone 2000, MS/DUKPT/STD Pin Pad, New" (printed Feb. 17, 2007), available at http://www.merchantamerica.com/creditcardterminals/index.php?ba=product_enlarge&product=9632, 1 page.

Griswold, Robert S., "Get Smart: The Coming Revolution of Smart Cards," *Journal of Property Management* (May/Jun. 1997), 5 pages.

Entrust Inc., "Entrust Authority Security Manager," (printed Aug. 13, 2004), available at http://www.entrust.com/authority/manager/index.htm, 23 pages.

Infosec Engineering, "Building a Corporate Public Key Infrastructure" (1999), available at http://www.infoseceng.com/corppki.htm, 20 pages.

LockStream Corporation, "Catalyst DRM Service Platform Architecture," Vers. 1.0 (Nov. 2003), pp. 1-28.

LockStream Corporation, "Catalyst DRM Service Platform" (printed Aug. 13, 2004), available at http://www.lockstream.com/products_spcm.php, 1 page.

LockStream Corporation, "Lockstream KeyDRM" (printed Aug. 13, 2004), available at http://www.lockstream.com/products_lgm.php, 2 pages.

LockStream Corporation, "Lockstream OMA 1.0 DRM Client" (printed Aug. 13, 2004), available at http://www.lockstream.com/products_sprm.php, 2 pages.

Microsoft Corporation, "Vendor Wrapper Service Provider" (Aug. 2002), available at http://msdn.microsoft.com/library/en-us/security/security/vendor_wrapper_service_provider.asp. pp. 1-2.

U.S. Appl. No. 10/956,861, Robinson.

U.S. Appl. No. 11/051,316, Mazza.

Datakey: "Securing a Virtual Private Network with Smart Card Technology"; Aug. 1, 2002; available at www.datakey.com: pp. 1-8.

ADTech Engineering, IP Phone SI-160 User Manual (SCCP releases) Version 1.2 (2002), pp. 1-20.

"The Cricket Indoor Location System: An NMS Project @ MIT LCS" at http://nms.lcs.mit.edu/projects/cricket (Jul. 31, 2002), pp. 1-5.

Roger Clarke, "Centrelink Smart Card Technical Issues Starter Kit Chapter 7" (Apr. 8, 1998) at http://www.anu.edu.au/people/Roger.Clarke/DV/SCTISK.html, pp. 1-3.

"Smart Card Authentication" at http://msdn.microsoft.com/library/en-us/security/security/smart_card_authentication.asp (Aug. 2002), pp. 1-2.

"Smart Card Interfaces" at http://msdn.microsoft.com/library/en-us/security/security/smart_card_interfaces.asp (Aug. 2002), p. 1.

"Primary Service Provider" at http://msdn.microsoft.com/library/en-us/security/security/primary_service_provider.asp (Aug. 2002), p. 1.

"Introducing Smart Cards to the System" at http://msdn.microsoft.com/library/en-us/security/security/introducing_smart_cards_to_the_system.asp (Aug. 2002), p. 1.

"Accessing a Smart Card" at http://msdn.microsoft.com/library/en-us/security/security/accessing_a_smart_card.asp (Aug. 2002), p. 1.

"Smart Card Resource Manager" at http://msdn.microsoft.com/library/en-us/security/security/smart_card_resource_manager.asp (Aug. 2002), p. 1.

"Smart Card User Interface" at http://msdn.microsoft.com/library/en-us/security/security/smart_card_user_interface.asp (Aug. 2002), p. 1.

"Smart Card Service Providers" at http://msdn.microsoft.com/library/en-us/security/security/smart_card_service_providers.asp (Aug. 2002), p. 1.

"Base Service Providers" at http://msdn.microsoft.com/library/en-us/security/security/base_service_provders.asp (Aug. 2002), p. 1.

"Building an ISO7816-4 APDU Command" at http://msdn.microsoft.com/library/en-us/security/security/building_an_iso7816_4_apdu_command.asp (Aug. 2002), pp. 1-2.

"Vendor Wrapper Service Provider" at http://msdn.microsoft.com/library/en-us/security/security/vendor_wrapper_service_provider.asp (Aug. 2002), pp. 1-2.

Motorola Press Release, "ERG Motorola Alliance Receives Award for Smart Card" (Jun. 6, 2000), available at http://www.motorola.com/LMPS/pressreleases/page888.htm, 3 pages.

NEC Infrontia Corporation Press Release, "Establishment of "SmartCardInfrontia" solutions for 'IC card'," (Mar. 13, 2002), 4 pages.

Novell®, "Certificate Server: Public Key Instrastructure," White Paper (1999), pp. 1-10.

Smart Card Alliance Industry News, "Cubic Introduces New Mobile Ticketing Machine" (Jul. 3, 2003), available at http://www.smartcardalliance.org/industry_news/industry_news_item.cfm?itemID=852, 2 pages.

Smart Card Alliance Industry News, "Cubic Corp. Introduces New National Security and Homeland Defense" (Sep. 9, 2002), available at http://www.smartcardalliance.org/industry_news/industry_news_item.cfm?itemID=310, 2 pages.

SSH Communications Security Corp., "Enabling Virtual Public Networks with Public Key Infrastructure," White Paper (Jan. 2004), pp. 1-9.

Streetman, Kibbee D. et al., "Public Key Infrastructure: Resources, Requirements and Recommendations," ATI IPT Special Report 00-06 (Apr. 2000), pp. 1-45.

Sun Developer Network, "Smart Card Overview," Sun Microsystems, Inc. (1994-2004), available at http://java.sun.com/products/javacard/smartcards.html, 2 pages.

NetLingo Dictionary of Internet Words, "Smart Card" (1995-0004), available at http://www.netlingo.com/lookup.cfm?term=smart+card, 2 pages.

Rankl, Wolfgang, "Smart Card Handbook," (Jun. 13, 2004), available at http://www.wrankl.de/SCH/SCH.html, 8 pages.

Russinovich, Mark, "Inside Encrypting File System, Part 1," *Windows & .NET Magazine* (Jun. 1999), available at http://www.winntmag.com/Articles/Index.cfm?ArticleID=5387&Key=Internals, 4 pages.

Russinovich, Mark, "Inside Encrypting File System, Part 2," *Windows & .NET Magazine* (Jul. 1999), available at http://www.winntmag.com/Articles/Index.cfm?ArticleID=5592&Key=Internals, 5 pages.

VeriFone Inc., "VeriFone Payment Solutions: Point-of-Sale PINpads" (1997-2004), available at http://www.verifone.com/products/printers_peripherals/html/pinpad_family.html, 1 page.

Whatis.com Target Search™, "PKI" (Jan. 13, 2004), available at http://whatis.techtarget.com/definition/0,289893,sid9_gci214299,00.html, 4 pages.

* cited by examiner

METHOD AND APPARATUS FOR CONTROLLING DATA AND SOFTWARE ACCESS

FIELD OF THE INVENTION

The present invention relates generally to software and data access, and more particularly, to a wireless proximity detection system which enables or disables software and data access.

BACKGROUND OF THE INVENTION

Software and data security are important considerations for many companies and individuals. Typically, in order to help insure that a user at a computer is an authorized user, a user account is required to access the computer. As is well known, a user logs in to the computer using the user account by entering user identification information and a password. This type of system is effective so long as the user logs out of the computer when leaving it unattended. However, if a user leaves the computer terminal unattended, an unauthorized user may use the computer and access the software or data. This unauthorized user may misappropriate information from the computer. Accordingly, it would be advantageous to have a device which automatically disables access to sensitive software and data when an authorized user leaves a computer unattended. Furthermore, such a password system has the additional possibility of an unauthorized user misappropriating the password. In such a case, even if the authorized user has logged out of the computer, the unauthorized user may use the misappropriated password to gain access to the system. Thus, it would also be advantageous to provide a system which limits access to software and data to situations where the authorized user is in close proximity to the computer.

In addition to passwords being required to access a system, another method of limiting access to a computer is through a special piece of hardware or "dongle." The dongle is a special piece of hardware that connects to the serial or parallel port of a computer. The software running on the computer sends a random number to the dongle. The dongle performs a secret computation and returns a result. The software makes a like computation and compares the results of the two computations. If the results match, the software continues to run. If the results do not match, the software does not run. Such a device is useful in helping to limit the misappropriation of passwords since the dongle is required to enable access to the software or data on a computer. However, similar to the situation described above where a user may leave a terminal unattended while logged in, a user may leave a terminal unattended with the dongle attached, thus opening up the possibility of unauthorized access. Thus, it would be advantageous for such a device to automatically disable when a user leaves a terminal while the dongle is attached.

Another method for limiting access to a computer is through card access to the computer. In such a system, the computer has an associated card reader, and user has a card which may be inserted into the card reader. The computer will not allow access to at least some data unless an authorized card is inserted into the card reader. The user typically wears the card around their neck, and in many cases are required to wear the card around their neck. Accordingly, when the user leaves the immediate vicinity of the computer, they must remove the card from the card reader, thus disabling access to restricted data through the computer. While such a system is effective in limiting access to restricted data, it can be very inconvenient for a user. The user must place the card into the reader, which requires removing it from around their neck, which may result in the user inadvertently leaving the card in the reader. In some cases, the user may have some type of retractable cable which connects to the card, and thus does not need to remove the card their person. However, when working at a computer it can be uncomfortable and inconvenient to have a card extending from the user to the computer. Accordingly, it would be advantageous to have a device which automatically disables access to restricted data when a user leaves a terminal which does not require the user to perform physical steps to enable and disable access.

Further adding to the possibility of unauthorized access is the increasing reliance on mobile devices such as laptop computers. These devices may be used in areas away from relatively secure areas of an individual's home or a company's building. When such a device is used in areas which are relatively insecure, such as an airport or a train, the number of potential unauthorized users increases, thus increasing the possibility that an unauthorized user will use the mobile device to access the software and data. Furthermore, such mobile devices are much more susceptible to theft. Thus, even if used in a relatively secure area, the device may be stolen and removed to another location relatively easily. If a dongle is used with the device, the dongle may also be taken if left attached to the device. This further increases the potential for unauthorized users to access the system. Accordingly, it would be advantageous to insure that a mobile device is secure, and that data and software stored on the device are less susceptible to access by unauthorized users. Furthermore, as mentioned above, it would be advantageous to have such a system which would automatically place the computer in a more secure state when an unauthorized user is not within a certain distance from the computer. Such a system would help insure that the data and software located on the computer are not accessible by an unauthorized user.

SUMMARY OF THE INVENTION

The present invention is directed to solving these and other problems and disadvantages of the prior art. According to the present invention, a computer system includes a local key which is operable to communicate wirelessly with a remote key that is associated with a user of a computer system. If the remote key (and thus the user) is within a preset radius of the computer system, the local key enables access to the computer system. If the remote key (and thus the user) is not within the preset radius, the local key acts to disable access to the computer system. Accordingly, access to the computer system is automatically disabled when a user of the system leaves the area of the computing system.

In accordance with an embodiment of the present invention, a computer requests a user to log into the computer. After receiving the login information, the computer verifies that the user is an authorized user based on the login information. The computer requests authentication, through wireless communication with a remote key associated with the user. When authentication from the remote key is received, access to the computer is granted, and when authentication from the remote key is not received, access to the computer is denied. The computer may wait for a predetermined time period, and repeat the authentication request. If the user, and associated remote key leave the area of the computer, access to the computer is disabled. In one embodiment, the computer requests authentication from the remote key at one minute time intervals.

In one embodiment, the local key is a dongle which is associated with the computer system. In this embodiment, the dongle includes a wireless transceiver for wirelessly communicating with the remote key. In one embodiment, the computer system communicates a random number to the dongle. The dongle receives the random number, and transmits an authentication request to the remote key. If the remote key responds to the authentication request, the dongle performs a calculation on the random number and communicates the result to the computer system. The computer system performs a predefined computation on the random number to obtain a calculated number, and compares the computed number to the number received from the dongle. Access to the computer is enabled when the computed number matches the number received from the dongle. In one embodiment, the remote key includes a transponder operable to return the response to the authentication request. In another embodiment, the remote key includes a transceiver operable to return the response to the authentication request. In yet another embodiment, the remote key and local key communicate using Bluetooth wireless protocol. In still another embodiment, the remote key includes a keypad and is operable to require a user to enter a password prior to returning a response to an authentication request.

In accordance with an embodiment of the present invention, an apparatus is provided for controlling access to a computer. According to such an embodiment of the present invention, a local key is operably connected to the computer, which is operable to enable access to data accessible by the computer. A remote key is operable to wirelessly communicate with the local key, such that when the remote key is outside of a predefined radius, the local key disables access to the data, and when the remote key is within the predefined radius the local key enables access to the data. In one embodiment, the remote key includes a wireless transceiver operable to receive transmissions from and send transmissions to the local key, a processor in communication with the wireless transceiver, and a memory portion in communication with the processor. The computer, in one embodiment, is operably connected to a network which contains the data. The local key, in one embodiment, includes a wireless transceiver which is operable to communicate with the remote key, the wireless transceiver having a transmission radius which corresponds to the predefined radius. In another embodiment, the remote key includes a transponder and the local key includes a wireless transceiver, the wireless transceiver being operable to communicate with the transponder when the transponder is within the predefined radius.

The local key may comprise a dongle operatively connected to the computer, according to one embodiment. The dongle is adapted to connect to one of a parallel port, a serial port, and a universal serial bus port, and communicate with the computer through the connection. In yet another embodiment, the remote key is included in an identification badge which is associated with a user of the computer.

In accordance with another embodiment of the present invention, a method is provided for controlling access to a computer. According to such an embodiment of the present invention, a computer requests login information from a user. The computer verifies that proper login information is received, and determines whether an authorization signal is received at a wireless proximity detector. When the authorization signal is received, the computer enables access to a user, and when the authorization signal is not received at the wireless proximity detector, the computer disables access to the user. The computer, in one embodiment, waits a predetermined time interval and again determines whether the authorization signal is received at the wireless proximity detector, and enables or disables access to the user based on whether the authorization signal is received. In one embodiment, the predetermined time interval is one minute. The authorization signal is associated with a base transmitter in an embodiment of the present invention.

These and other advantages and features of the invention will become apparent from the following description of the invention taken together with the drawings.

DETAILED DESCRIPTION

Figure 1:
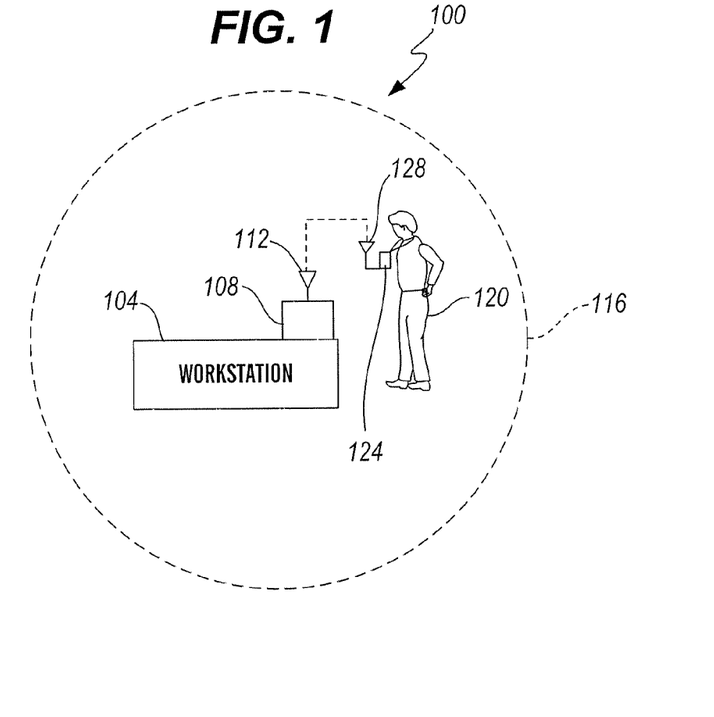
FIG. 1 is a diagrammatic representation of a workstation and a user with a remote key within a preset radius of the workstation, according to an embodiment of the present invention.
Figure 2:
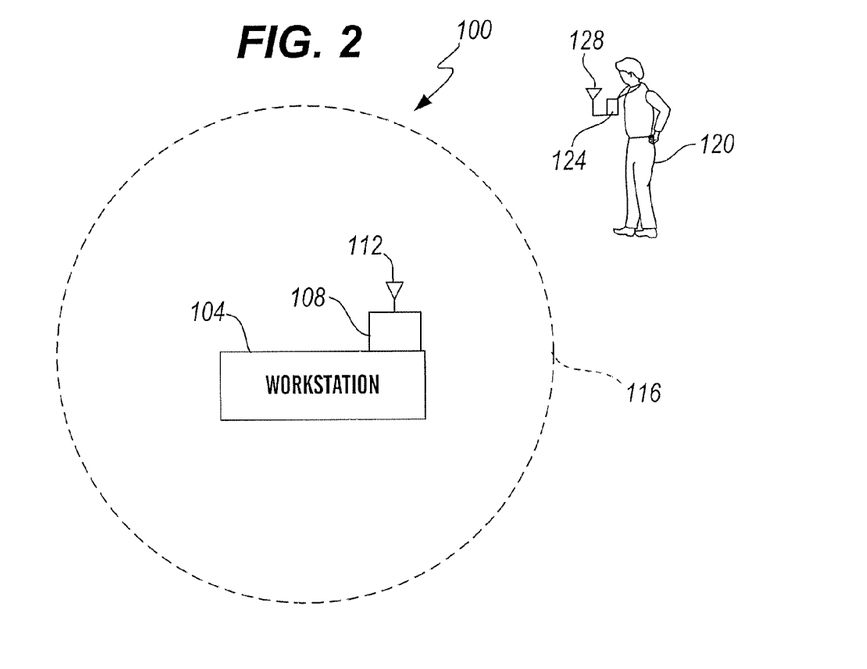
FIG. 2 is a diagrammatic representation of a workstation and a user with a remote key outside of a preset radius of the workstation, according to an embodiment of the present invention.

Referring to FIGS. 1 and 2, a wireless proximity detection system 100 of one embodiment of the present invention is described. The wireless proximity detection system 100 includes a workstation 104 which has a wireless proximity detector 108. The wireless proximity detector 108 includes an antenna 112, which transmits detection signals. The wireless proximity detector 108 transmits the detection signals using a low power transceiver, which is capable of transmitting and receiving signals within a predefined circumference 116. A first user 120 has a first remote key 124 which is capable of transmitting a signal to the wireless proximity detector 108 in response to a signal received at the first remote key 124 from the wireless proximity detector 108. In the illustration of FIG. 1, the first user 120 is inside the predefined circumference 116, and thus the first remote key 124 receives the signal from the wireless proximity detector 108, and sends a return signal to the wireless proximity detector 108. Upon detection of the return signal, the wireless proximity detector 108 enables the workstation 104 to allow access to the first user 120. In the illustration of FIG. 2, the first user 120 is outside of the predefined circumference 116. In this case, the first remote key 124 does not receive the signal from the wireless proximity detector 108, and thus does not generate and send a return signal. The wireless proximity detector 108 then discontinues allowing access to the workstation 104 if access had already been granted, or continues to deny access to the workstation 104 if access had not been granted. The operational steps for the wireless proximity detector 108 and the remote key 124 will be described in more detail below. The predefined circumference 116 may be any range of distances from the workstation desired, with the signal strength capable of being transmitted by the wireless proximity detector 108 and the remote key 124 selected according to the desired range. In one embodiment, the predefined circumference is selected to be approximately ten feet. The workstation 104, in one embodiment, is simply a desktop computer type workstation. The workstation 104, in other embodiments, may be a laptop computer, a kiosk, or any other type of equipment containing sensitive information, or through which sensitive information may be accessed. The wireless proximity detector 104 may be any appropriate piece of hardware associated with the workstation 104, and in one embodiment is a dongle which connects to a port on the workstation. The dongle contains a short range transceiver which is capable of sending and receiving radio signals. It will be understood that the wireless proximity detector 108 may also be integrated into the workstation 104, such as a hardware card which may be inserted into a port on a main board of the workstation, or integrated with other hardware components within the workstation. The remote key 124 includes a transmitter portion, and an antenna 128. The remote key 124, and wireless proximity detector 108 will be described in more detail below.

Figure 3:
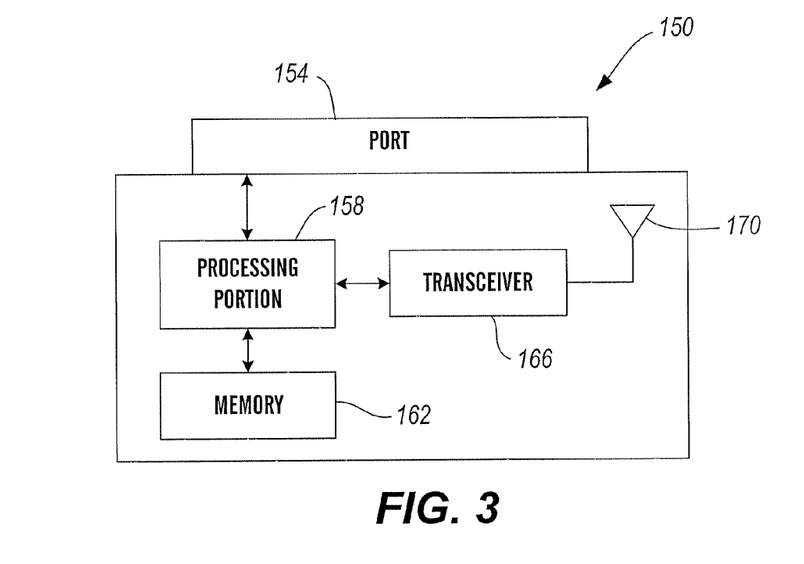
FIG. 3 is a block diagram representation of a local key according to an embodiment of the present invention.

In one embodiment, illustrated in FIG. 3, a dongle 150 serves as the wireless proximity detector. The dongle 150 includes a port 154 which is used to connect to an associated port on a workstation. The port 154 may be adapted to be connected to a parallel port, a serial port, or any other type of port which may be available for data transfer on the workstation, including a universal serial bus (USB) port. The dongle 150 includes a processing portion 158 which performs processing functions. The processing portion 158 is in communication with a memory 162, which contains program instructions and any other information required to operate the dongle and wireless proximity detector. The memory 162 may be any form of appropriate memory, including hard wired read only memory (ROM), electronically erasable programmable read only memory (EEPROM or flash memory), and magnetic media. The dongle 150 also includes a transceiver 166 capable of transmitting and receiving wireless signals via an antenna 170. The transceiver 166 communicates with the processing portion 158, and operates based on instructions received from the processing portion 158. It will be understood that the processing portion 158, memory 162, and transceiver 166 may all be integrated into a single integrated circuit. Likewise, the processing portion 158, memory, and transceiver 166 may be discrete components located on a printed circuit board, with the printed circuit board also including a printed antenna portion which may be used as the antenna 170.

In this embodiment, the dongle 150 is attached to an appropriate port on the workstation. The workstation includes software which requires a dongle 150 to operate. The software sends a random number to the dongle 150. The dongle 150 performs a secret computation and returns the result. The software makes a like computation and compares the results of the two computations. If the results match, the software continues to run. If the results do not match, the software does not run. In this embodiment, the dongle 150 transmits periodic signals to a remote key using the transceiver 166. If the dongle 150 does not receive an appropriate return signal from the remote key, the dongle 150 does not return the correct result to the software running on the workstation, thus disabling the software. In this embodiment, the dongle 150 may be used with existing access software which may be installed on the workstation which required a dongle to enable access to the workstation. Thus, the wireless proximity detection of this embodiment is operable to function on an existing installed base of workstations and associated software. The dongle and associated remote key may simply be installed into an existing system. Alternatively, the workstation may include software which operates with the dongle, and does not include the computational component. Furthermore, in one embodiment, the random number is transmitted from the dongle to the remote key. The remote key performs the calculation on the random number and returns the result to the dongle, which passes this result on to the workstation, which enables or disables access based on the result.

Figure 4:
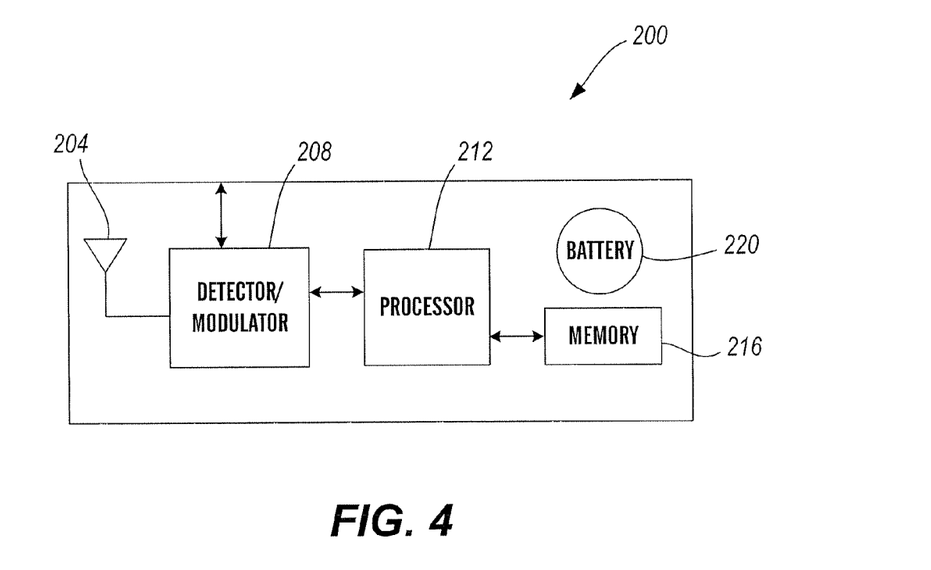
FIG. 4 is a block diagram representation of a remote key according to an embodiment of the present invention.

With reference now to FIG. 4, a block diagram illustration of a remote key 200 of one embodiment of the present invention is described. The remote key 200 may be in a number of forms, and may be included, for example, in an employee's identification badge or card. The remote key 200 includes an antenna 204, a detector/modulator 208, a processor 212, and a memory 216. The remote key 200 in this embodiment also includes a battery 220, which is used as a power source for the remote key. The antenna 204 operates to pick up a signal from the wireless proximity detector which is received at the detector/modulator 208. The detector/modulator 208 demodulates the signal received at the antenna 204 and provides the information contained in the signal to the processor 212. The processor 212 receives the information and prepares information to include in a return signal.

The information to be included in the return signal, in one embodiment, is an identification string which is contained in the memory 216. The processor 212 provides this information to the detector/modulator 208, which modulates the information onto a radio signal and transmits the return signal using the antenna 204. In one embodiment, the remote key 200 and the wireless proximity detector 150 of FIG. 3 communicate using a wireless protocol such as Bluetooth™ wireless communications. While the remote key 200 illustrated in FIG. 4 includes a battery 220, other embodiments exist which do not require battery power at the remote key, such as a transponder. The transponder, as is known in the art, uses energy transmitted in the received signal to power circuitry in the remote key and transmit a return signal. Such transponders have common usage in, for example, identification badges which are used to restrict access to offices or buildings. Communication protocols for such transponders are well known and several standard protocols exist for such devices, including ISO International Standards 14443 and 15693.

In another embodiment, the remote key also has a keypad, which allows for entry of a password into the remote key. The remote key may require the password to be entered at predetermined time intervals. For example, if a user entered a password into the remote key, and did not log out of the remote key, the key would automatically log the user out after the predetermined time period. The predetermined time period may be any arbitrary time period, and in one embodiment is eight hours. In this manner, the remote key is made more secure, since if it is lost or stolen even when a user is logged in, access will be restricted after the predetermined time period. Thus, if a pirate attempted to steal a laptop and the remote access key, access to sensitive information in the laptop would be limited to the time remaining in the predetermined time period. The remote key may also expire after a certain period of time. For example, the remote key may be valid for one year, with the expiration date being transmitted with the return signal. If the wireless proximity detector received the return signal which indicated that the remote key had expired, the wireless proximity detector would operate to restrict access to the workstation. Furthermore, the expiration of the remote key may correspond to an expiration of a license associated with particular software associated with the workstation. In this manner, a software distributor may control the licensing and use of software.

Figure 5:
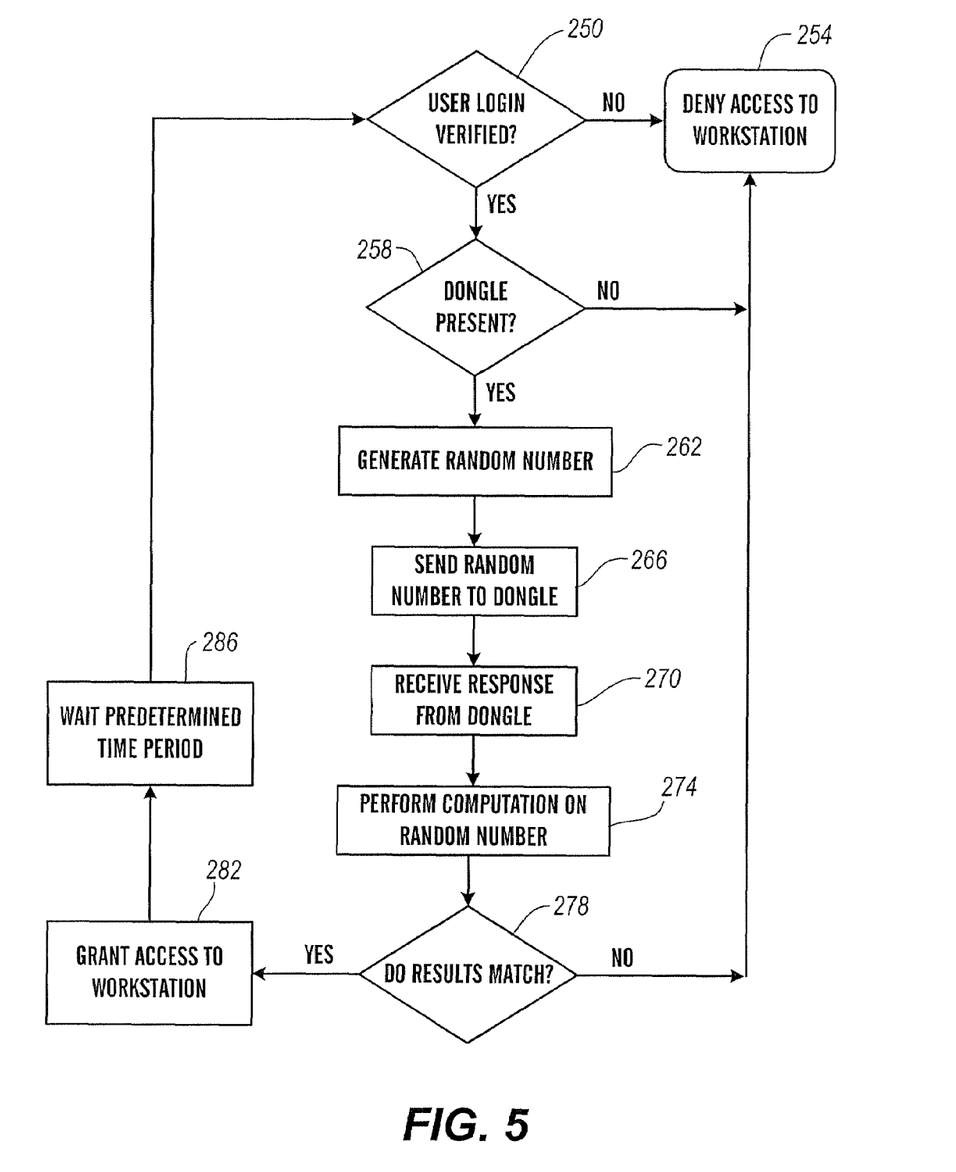
FIG. 5 is a flow chart illustration of the operational steps performed by a workstation in an embodiment of the present invention.

With reference now to FIG. 5, a flow chart illustration of the operational steps performed by the workstation in one embodiment are now described. Initially, as noted at block 250, the workstation verifies that the user has properly logged into the workstation. If there is not a proper login, access is denied to the workstation, as noted by block 254. If the user is properly logged in, the workstation determines if a dongle is present, as noted by block 258. If a dongle is not present, access is denied to the workstation according to block 254. If a dongle is present, the workstation generates a random number, as noted by block 262. The random number is sent to the dongle, as indicated by block 266. The workstation, at block 270, receives a response from the dongle. The workstation then performs a predetermined computation on the random number, which corresponds to the computation performed by the dongle, as noted by block 274. At block 278, the workstation determines if the results returned from the dongle match the results of the computation performed by the workstation. If the results do not match, access to the workstation is denied, as noted by block 254. If the results do match, access is granted to the workstation, according to block 282. The workstation then, at block 286, waits for a predetermined time period, and repeats the operations associated with blocks 250 through 282. In one embodiment, the predetermined time period is one minute, although other time periods may be used including time periods which are shorter than one minute, and time periods which are longer than one minute.

Figure 6:
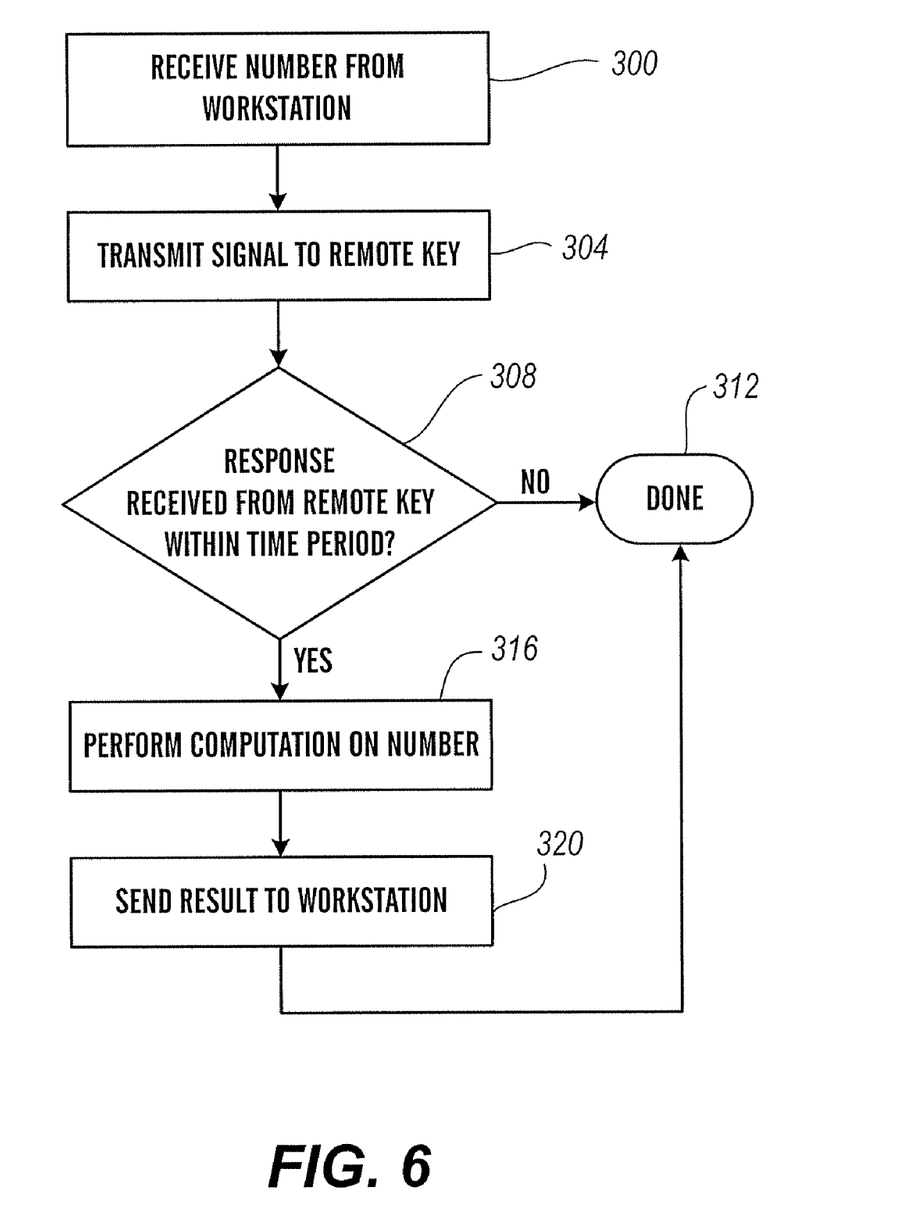
FIG. 6 is a flow chart illustration of the operational steps performed by a local key in an embodiment of the present invention.

Referring now to FIG. 6, the operational steps performed by the wireless proximity detector of one embodiment are now described. Initially, as noted by block 300, the wireless proximity detector receives a number from the workstation. The wireless proximity detector transmits a signal to the remote key, as indicated at block 304. The wireless proximity detector, at block 308, determines if an appropriate response has been received from the remote key within a predetermined time period. In one embodiment, the wireless proximity detector determines if an appropriate response is received from the remote key by comparing an identification string from the remote key with an authorized identification code, or list of authorized identification codes, which is stored in the wireless proximity detector. If an appropriate response is not received from the remote key, the wireless proximity detector takes no further action, as noted by block 312. If an appropriate response is received from the remote key, the wireless proximity detector performs a predetermined computation on the number received from the workstation, as noted by block 316. The wireless proximity detector, at block 320, sends this result to the workstation, and the operation is done as indicated by block 312.

Figure 7:
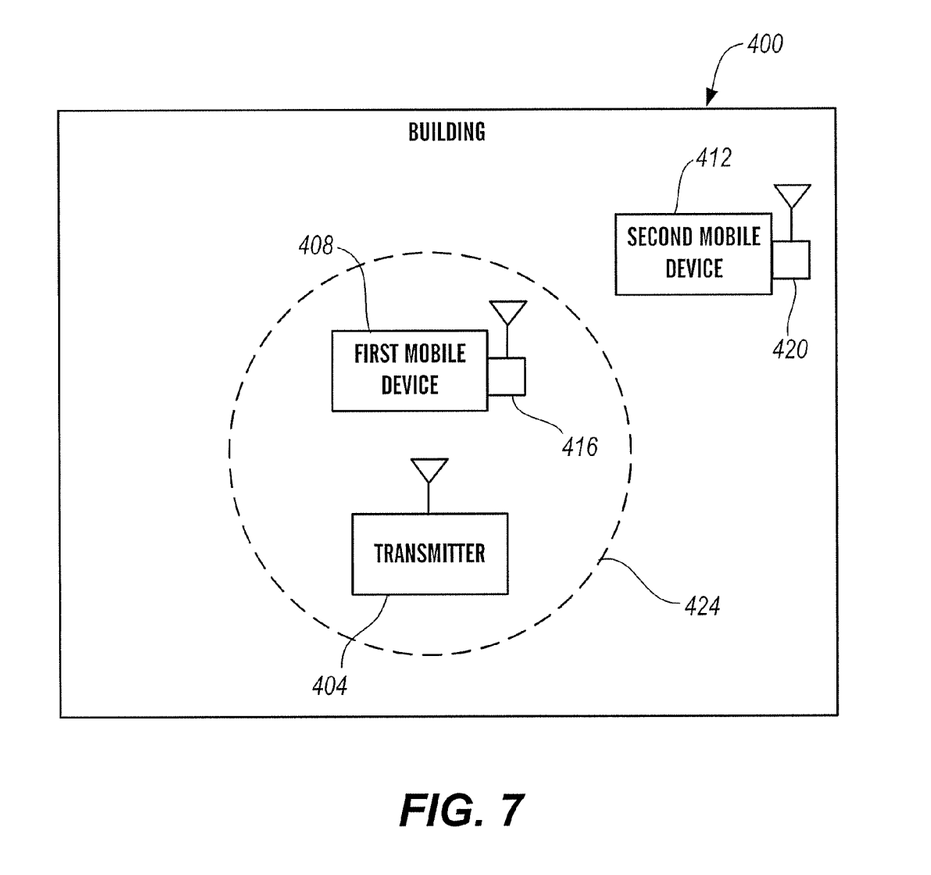
FIG. 7 is a diagrammatic illustration of a building having a base transmitter operable to enable computer access to mobile devices which are within a preset radius of the base transmitter, according to an embodiment of the present invention.

With reference now to FIG. 7, another embodiment of the present invention is now described. In this embodiment, a building 400 contains a transmitter 404. In the example of FIG. 7, there is also a first mobile device 408, and a second mobile device 412 in the building. The first mobile device 408 includes a wireless proximity detector 416, and the second mobile device 412 contains a wireless proximity detector 420. The transmitter 404 transmits signals periodically, with the transmitted signals having a range illustrated by the circumference 424 from the transmitter 404. The first mobile device 408 is within the circumference 424, thus wireless proximity detector 416 receives the transmitted signal, and allows a user of the first mobile device to access software and/or data which would be restricted if the first mobile device had not received the signal from the transmitter 404. In the example of FIG. 7, the second mobile device 412 is not within the circumference 424, and thus the wireless proximity detector 420 would not receive the transmitted signal and access to software and/or data on the second mobile device would be restricted. In this manner, a company may allow users of mobile devices, such as laptop computers, to travel outside of the company facility with the mobile devices, and not have access to sensitive software or data. Thus, when a user is in the company facility, their mobile workstation receives the signal from the transmitter, and allows access to data and/or software.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, or within the scope of the present invention. The embodiments described hereinabove are further intended to explain the best mode presently known of practicing the invention and to enable others skilled in the art to utilize the invention in such or other embodiments and with various modifications required by their particular application or use of the invention. It is intended that the appended claims be construed to included the alternative embodiments to the extent permitted by the prior art.

What is claimed is:

1. In a system comprising at least one stationary transmitter and a wireless proximity detector in communication with and connected physically to a mobile computational device, a method comprising:

while the stationary transmitter is not physically connected from the mobile computational device, granting a user access, by the wireless proximity detector, to the mobile computational device's local software and/or data, when the wireless proximity detector determines that the detector and mobile computational device are within a selected range of the stationary transmitter; and while the stationary transmitter is disconnected physically from the computational device, prohibiting user access, by the wireless proximity detector, to of the mobile computational device's local software and/or data, when the wireless proximity detector determines that the detector and mobile computational device are not within the selected range of the stationary transmitter, wherein, in the absence of a range determination by the detector, the ability of the mobile computational device to provide the user access to the local software and/or data is prohibited and is independent of the distance between the mobile computational device and the stationary transmitter.

2. The method of claim 1, wherein the wireless proximity detector determines that the wireless proximity detector is (a) within the selected range when a wireless signal transmitted by the stationary transmitter has at least a determined signal strength and (b) outside of the selected range when the wireless signal does not have at least a determined signal strength.

3. The method of claim 1, wherein the wireless proximity detector determines that the wireless proximity detector is (a) within the selected range when a wireless signal transmitted by the stationary transmitter is received by the detector and (b) outside of the selected range when the wireless signal is not received by the detector.

4. The method of claim 1, wherein the mobile computational device is, in the absence of a range determination by the detector, able to provide the user with access to the local software and/or data.

5. A computer readable medium comprising processor executable instructions operable to perform the steps of claim 1.

6. The method of claim 1 wherein said selected range is contained with a company office.

7. A system comprising:
   at least one stationary transmitter;
   a mobile computational device; and
   a wireless proximity detector, in communication with and connected physically to the mobile computational device, operable to:
      while the stationary transmitter is not physically connected from the computational device, grant a user access, by the wireless proximity detector, to the mobile computational device's local software and/or data, when the wireless proximity detector determines that the detector and mobile computational device are within a selected range of the stationary transmitter; and
      while the stationary transmitter is disconnected physically from the computational device, prohibit user access, by the wireless proximity detector, to the mobile computational device's local software and/or data, when the wireless proximity detector determines that the detector and mobile computational device are not within a selected range of the stationary transmitter, wherein, in the absence of a range determination by the detector, the ability of the mobile computational device to provide the user access to the local software and/or data is prohibited and is independent of the distance between the mobile computational device and the stationary transmitter.

8. The system of claim 7, wherein the wireless proximity detector determines that the wireless proximity detector is (a) within the selected range when a wireless signal transmitted by the stationary transmitter has at least a determined signal strength and (b) outside of the selected range when the wireless signal does not have at least a determined signal.

9. The system of claim 7, wherein the wireless proximity detector determines that the wireless proximity detector is (a) within the selected range when a wireless signal transmitted by the stationary transmitter is received by the detector and (b) outside of the selected range when the wireless signal is not received by the detector.

10. The system of claim 7, wherein the mobile computational device is, in the absence of a range determination by the detector, able to provide the user with access to the local software and/or data.

11. The system of claim 7, further comprising:
    a local key operably connected to said mobile computational device, the local key being operable to enable access to said local software and/or data; and
    a remote key operable to wirelessly communicate with said local key, wherein, when said remote key is outside of a predefined radius, said local key disables access to said local software and/or data, and, when said remote key is within said predefined radius, said local key enables access to said local software and/or data.

12. The system of claim 11, wherein said remote key includes:
    a wireless transceiver operable to receive transmissions from and send transmissions to said local key;
    a processing portion in communication with said wireless transceiver; and
    a memory portion in communication with said processing portion.

13. The system of claim 12, wherein said local key comprises a dongle operatively connected to said mobile computational device.

14. The system of claim 13, wherein said dongle is adapted to connect to one of a parallel port, a serial port, and a universal serial bus port.

15. The system of claim 12, wherein said remote key is included in an identification badge.

16. The system of claim 7, wherein the selected range corresponds to a size of a company office.

17. A method, comprising:
    providing a portable device, the portable device comprising a wireless proximity detector, and a stationary transmitter, the stationary transmitter transmitting a wireless signal having a selected range;
    while the stationary transmitter is not physically connected from the portable device, granting user access, by the wireless proximity detector, to the portable device's local software and/or data, when the wireless proximity detector determines that the detector and portable device are within the selected range of the stationary transmitter; and
    while the stationary transmitter is disconnected physically from the portable device, prohibiting a user access, by the wireless proximity detector, to portable device's local software and/or data, when the wireless proximity detector determines that the detector and portable device are not within the selected range, the local software and/or data of the portable device being otherwise user accessible when the wireless proximity determines that the detector and portable device are not within the selected range, and, in the absence of a range determination by the detector, the ability of the portable device to provide the user access to the local software and/or data is prohibited and is independent of the distance between the portable device and the stationary transmitter.

18. The method of claim 17, wherein, the wireless proximity detector determines that the wireless proximity detector is (a) within the selected range when a wireless signal transmitted by the stationary transmitter has at least a determined signal strength and (b) outside of the selected range when the wireless signal does not have at least a determined signal strength.

19. The method of claim 17, wherein, the wireless proximity detector determines that the wireless proximity detector is (a) within the selected range when a wireless signal transmitted by the stationary transmitter is received by the detector and (b) outside of the selected range when the wireless signal is not received by the detector.

20. The method of claim 17, wherein the portable device is, in the absence of a range determination by the detector, able to provide the user with access to the local software and/or data.

21. The method of claim 17, wherein said selected range is a predetermined transmission radius of the stationary transmitter.

22. The system of claim 17, wherein the selected range marks a perimeter of at least part of a company facility.

23. A computer readable medium comprising processor executable instructions to perform the steps of claim 17.

* * * * *